Sept. 11, 1945.   D. B. CLARK   2,384,601
METHOD FOR MAKING MOTION PICTURES
Filed Jan. 9, 1942
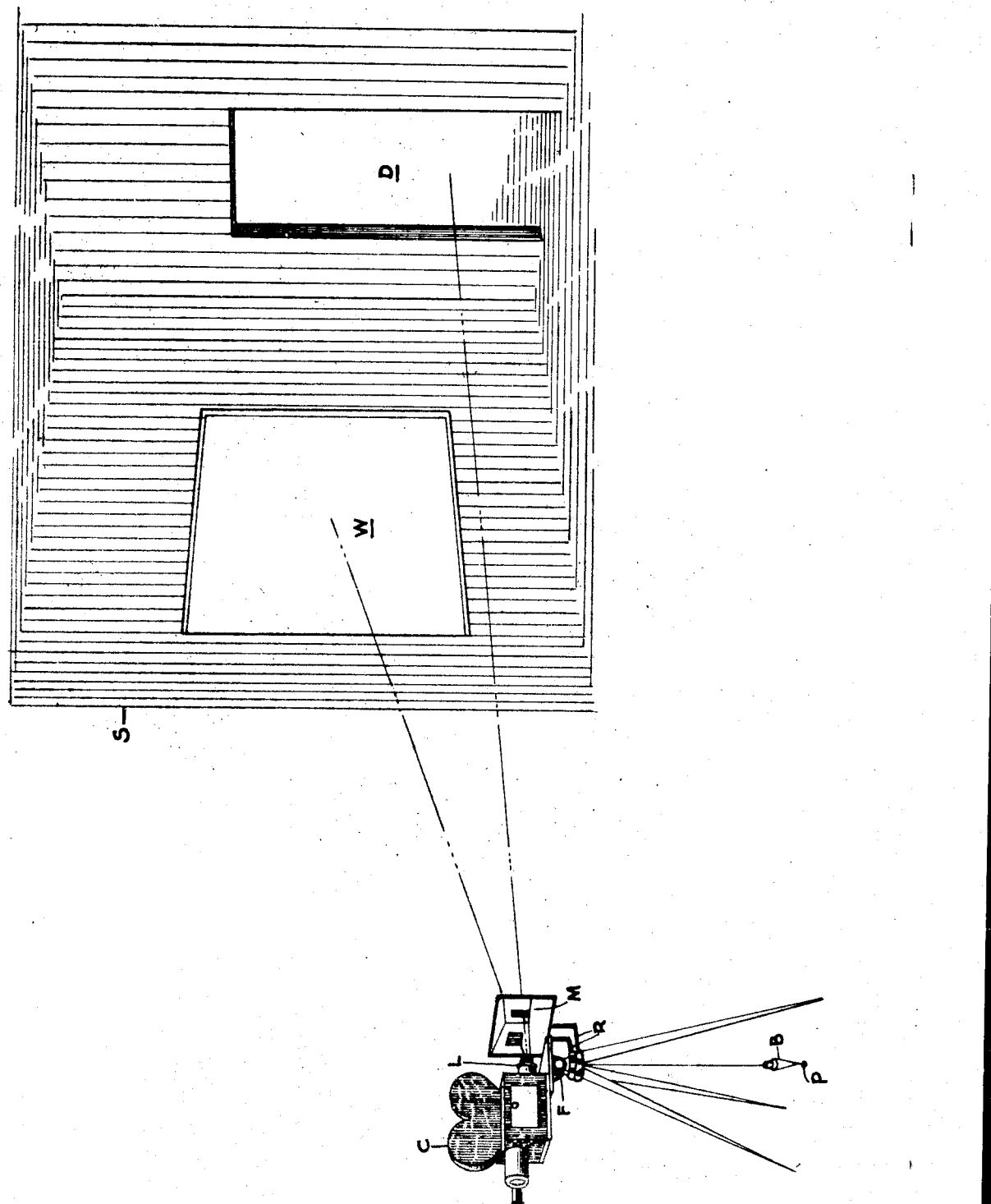
INVENTOR
Daniel B. Clark
BY
ATTORNEY Patented Sept. 11, 1945

2,384,601

UNITED STATES PATENT OFFICE 2,384,601

METHOD FOR MAKING MOTION PICTURES

Daniel Bryan Clark, Los Angeles, Calif., assignor to Twentieth Century-Fox Film Corporation, Los Angeles, Calif., a corporation of New York Application January 9, 1942, Serial No. 426,205

7 Claims. (Cl. 88—16)

This invention relates to the art of photography and deals with a method for making special effect shots, such as photographically converting daylight scenes into night scenes without stopping down the camera aperture or using special lighting or conventional filters.

The invention to be described hereinafter has been developed for use in motion picture photography, but it will become obvious as the description proceeds that it may be used equally as well in still photography and may likewise be used by amateurs as well as professionals.

One of the principal objects of the invention is to provide a method for making special effect shots, such as night scenes in daylight, which under the method disclosed herein may be made in the regular order by photographing through a specially prepared mask, the mask being a negative of the same scene in photographic registration therewith.

Other objects and advantages will appear as the description proceeds in conjunction with the drawing in which is shown a perspective view of one way of practicing my invention.

Briefly stated, the invention consists in first making a negative of the scene to be photographed. This may be done by the camera to be used in photographing the scene, or a special camera may be used for this purpose. The negative is then developed and is subsequently used in front of the camera lens as a mask M. It will be noted that the mask M is a reversal of the scene S and that it is placed in front of the camera lens L so that its component densities optically register with their respective highlights in the scene S. The density of the various parts of the negative will depend upon conditions to be described later. The negative mask may be small and positioned close to the lens L, but a small mask obviously is more difficult to bring into optical registration with the field. If the negative is too small, an enlarged duplicate may be made, although this could be avoided by making a sufficiently large original negative. The camera for photographing the scene must be set at substantially the same position from which the original negative was shot, indicated by the plumb bob B and the point P, and the scene is then photographed through the negative mask which is held in photographic registration with the scene. The result is a darkening over the entire picture with the highlights being especially toned down. The darkening effect on the picture will of course depend on the density of the negative, and if the density is properly controlled the highlights may be subdued to the extent that the picture will have the appearance of a night scene, with the advantage that the detail in the shadows will be more pronounced than if the scene were actually shot at night or in subdued lighting.

The concept of the invention is based upon the theory that if a positive and a negative of the same scene are superposed in registration the result is a uniform density over the entire area which obliterates the picture, providing the corresponding positive and negative densities are in reciprocal relation and the gamma of the negative and the positive is in the ratio of one to one. To get a picture from a positive and negative in such superposed relation, the gamma and/or the reciprocal relation between the positive and negative are varied from the one to one relation, which produces a picture having a masking effect that is non-linear and non-uniform with respect to density. The effect is to distort the densities in the picture. That is, there will be more density covering the highlights than the shadows or vice versa, depending on which way the variation was made. In my invention I vary this relation to tone down the highlights and bring out the shadows for photographically converting a daylight shot into a night scene. However, I do not intend to confine my invention to this single purpose or variation, since there may be occasions when a variation in the opposite direction would produce useful results. The foregoing theory when properly reduced to practice provides a method peculiarly suited for making night scenes out of daylight shots.

In practice, the amount of density on the negative to produce a night scene will be determined by the darkness desired in the scene. In forming the densities on the mask M, I may depend on straight time and temperaure processing or I may resort to bleaching or intensification of parts of the negative. My invention in this respect is intended to cover known chemical processes of treating photographic emulsions, including dyeing and coloring either chemically or manually. To convert exterior daylight shots into night scenes, it may be necessary to bleach certain parts of the film and to intensify others. When such a mask is used with action in the foreground, care must be exercised to confine the action to the clear part of the mask; otherwise, there would be an undesirable darkening effect over the actor when he enters certain parts of the scene. Also, there may be occasions where a color tone would be desirable in the filter. This may be applied in the form of a chemical dye, converting the whole mask into a variable density monochrome filter, or the color may be applied manually to certain areas of the mask with a variety of colors used separately on the same mask. In some cases where it is not desired to produce a night scene or where the scene may be shot in the interior of a building and the outside light may be admitted through windows or doors, such as shown in the scene S, it may be desirable to tone down the highlights coming from the outside so that detail may be had on the exterior as well as the interior. Here again any action in the foreground should be confined to the clear area of the mask to avoid shadows on the performers. Both graduated and flat neutral density filters have been used for this purpose, but they only knock down the light intensity uniformly over both the interior and the exterior and do not tone down the highlights more than the shadows. Under my invention a mask will be formed which will do this by making the same negative as above, but with a lower density, which in effect will result in a matte having a plurality of well defined zones scattered over the picture. These scattered zones of density correspond to the hightlights and, since the density over the highlights will be much greater than the density over the rest of the picture, it is obvious that the highlights may be knocked down to a light level comparable to the interior and the whole scene may then be shot under ordinary light and exposure conditions. In practice it becomes merely a matter of making one of these filters for each shot and using them in photographic registration with the scene to be shot.

Attention is directed toward the mounting of the mask M and the camera C. It will be noted that the camera C is mounted upon a "free-head" F, so that it may be rotated about a horizontal axis and a vertical axis. The rotation about the vertical axis is called a "panning" movement. The mask M is supported by rods R which in turn are mounted upon a non-rotatable part of the free-head F while the camera is mounted upon the rotatable part of the free-head, with the result that as the camera is panned the lens L will turn upon its nodal point and the mask M will remain sationary. This arrangement permits panning without relative movement between the mask and the scene.

Although I have illustrated my invention in connection with an interior still scene, it is to be understood that it is equally as applicable to exterior scenes and may be equally adaptable to the making of motion pictures.

I claim:
1. A method for making motion pictures consisting in making a negative of a still scene to be shot treating said negative so that the densities produced therein will not be complementary to corresponding light intensities of the scene and subsequently photographing action in the same scene through said negative in photographic registration with the scene.

2. A method for making motion pictures consisting in making a negative of a scene, intensifying portions of said negative corresponding to highlights of the scene, and photographing action in said scene through said negative in photographic registration with said scene.

3. A method for making motion pictures consisting in making a negative of a scene, bleaching selected portions of said negative to permit action to be photographed therethrough, and photographing said scene and said action through said negative in photographic registration with said scene.

4. A method for making motion pictures consisting in making a negative of a scene, intensifying portions of said negative corresponding to highlights of the scene, bleaching other portions of said negative, and photographing action in said scene through said negative in photographic registration with said scene.

5. A method for photographically converting a motion picture daylight scene into a motion picture night scene consisting in photographing daylight action in said scene through a negative of the same scene in photographic registration therewith, said negative being developed to a relatively high gamma so that the ratio of effective light reduction in the scene is highest on the greatest light intensity in said scene.

6. A method for photographically converting a motion picture daylight scene into a motion picture night scene consisting in photographing daylight action in said scene through a negative of the same scene in photographic registration therewith, said negative being developed to a gamma that produces densities in the negative which will not be complementary to corresponding light intensities of the scene.

7. A method for photographically converting a motion picture daylight scene into a motion picture night scene consisting in photographing daylight action in said scene through a negative of the same scene in photographic registration therewith, said negative being developed to a gamma such that the densities produced therein will be disproportional to corresponding light intensities of the scene.

DANIEL BRYAN CLARK.